United States Patent [19]

Spiece

[11] Patent Number: 4,798,543

[45] Date of Patent: Jan. 17, 1989

[54] INTERACTIVE TRAINING METHOD AND SYSTEM

[75] Inventor: Rickey J. Spiece, Park Ridge, Ill.

[73] Assignee: Bell & Howell Company, Skokie, Ill.

[21] Appl. No.: 481,090

[22] Filed: Mar. 31, 1983

[51] Int. Cl.[4] ............................................. G09B 5/00
[52] U.S. Cl. ................................................. 434/323
[58] Field of Search ...................................... 434/323

[56] References Cited

U.S. PATENT DOCUMENTS 4,360,345  11/1982  Hon .................................. 434/323

FOREIGN PATENT DOCUMENTS 0008124  2/1980  Fed. Rep. of Germany ...... 434/323
2837402  3/1980  Fed. Rep. of Germany ...... 434/323

OTHER PUBLICATIONS

David Scott, "*Electronic Teacher Links Far-Flung Classrooms*", Feb. 1982, Popular Science, p. 60.

Primary Examiner—Leo P. Picard
Attorney, Agent, or Firm—James V. Lapacek; Joan Pennington; Stanley J. Tomsa

[57] ABSTRACT

Interactive training method and system is provided for the selective presentation of audio and video training program information to learner-operators. The audio and video program information is transduced from recorded program media under the control of a program control unit. The program control unit includes a computer that is responsive to a control program record. The recorded audio and video program information and the control program define a lesson of a training program. Each lesson includes a plurality of lesson segments or units. The interactive training system includes a video transducing device for a first program record that includes video program information and accompanying audio information. The video transducing device is capable of single video frame display as a still frame. The system also includes an audio transducing device for a second program record that includes audio program information. The program control computer is also responsive to recorded program data to output computer generated text and/or graphic video display frames. Each learner-operator interfaces the system via a light pen entry device that provides video display frame position information. The program control computer provides a presentation of the lesson by selectively controlling a combination of addressable information segments from the first and second program records and the computer generated text and graphic recorded data in a predetermined display format as modified by multiple branching capabilities in response to learner-operator entry data information.

33 Claims, 12 Drawing Sheets

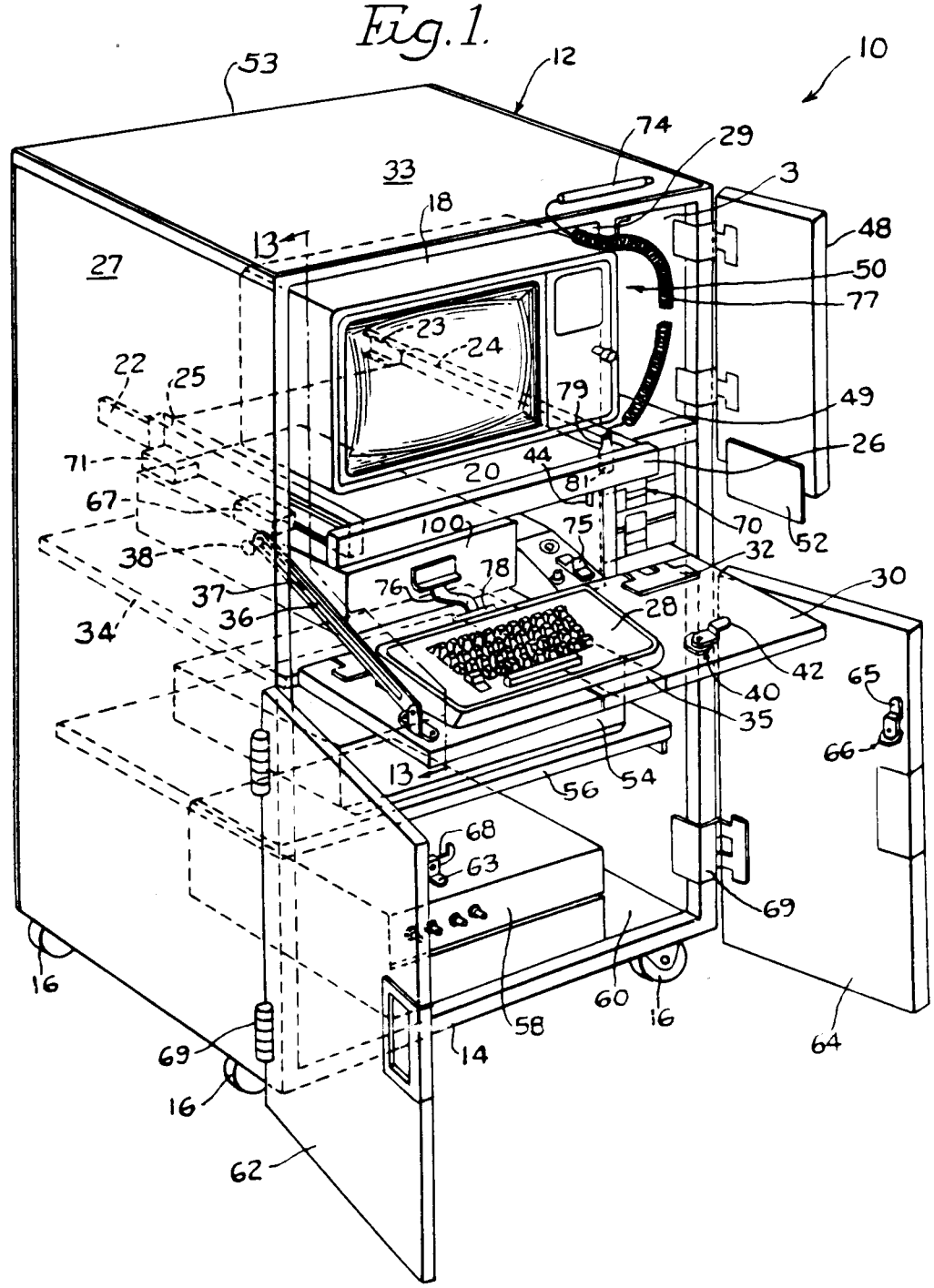

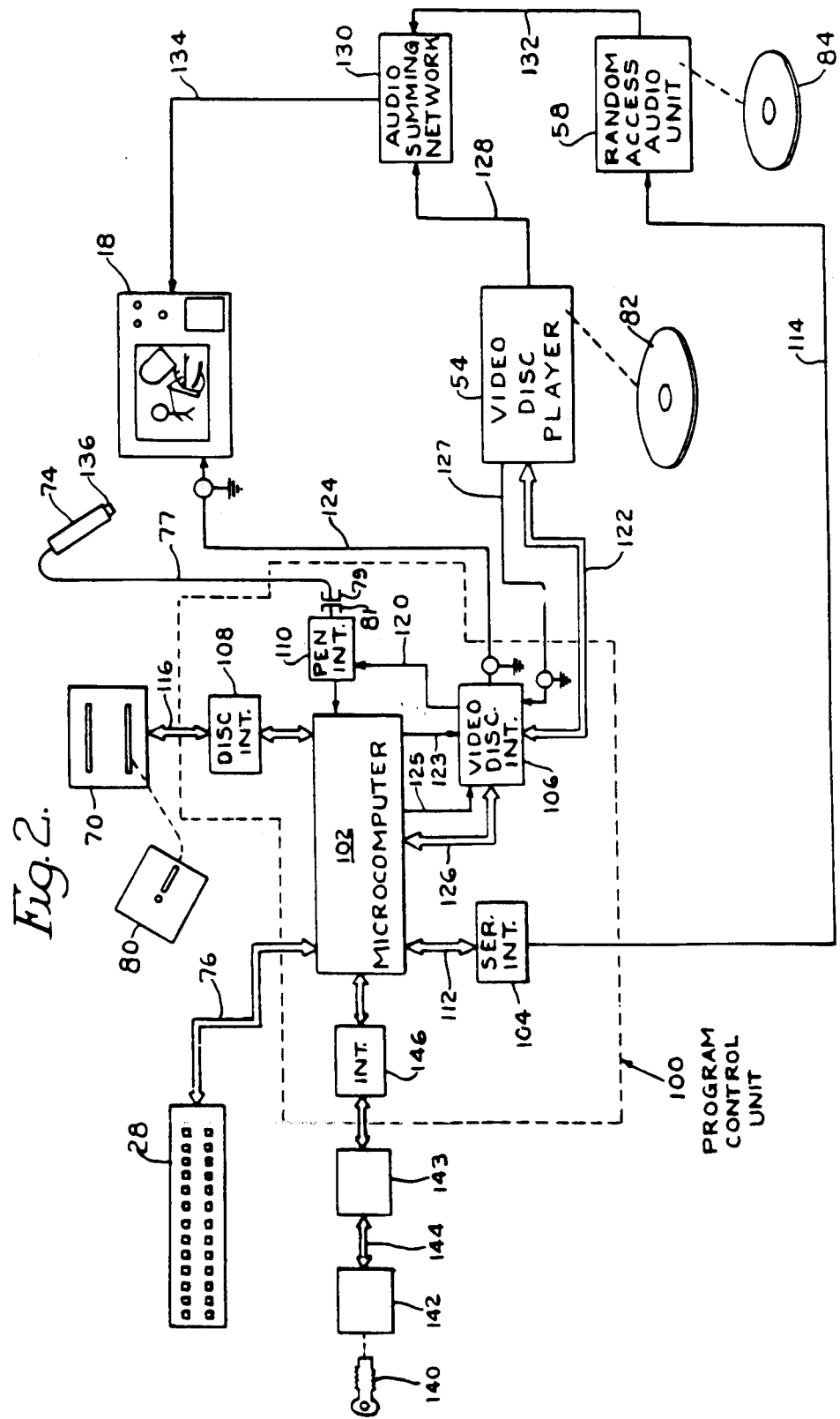

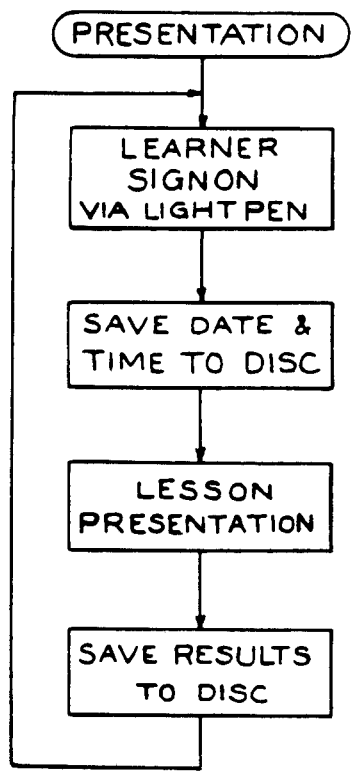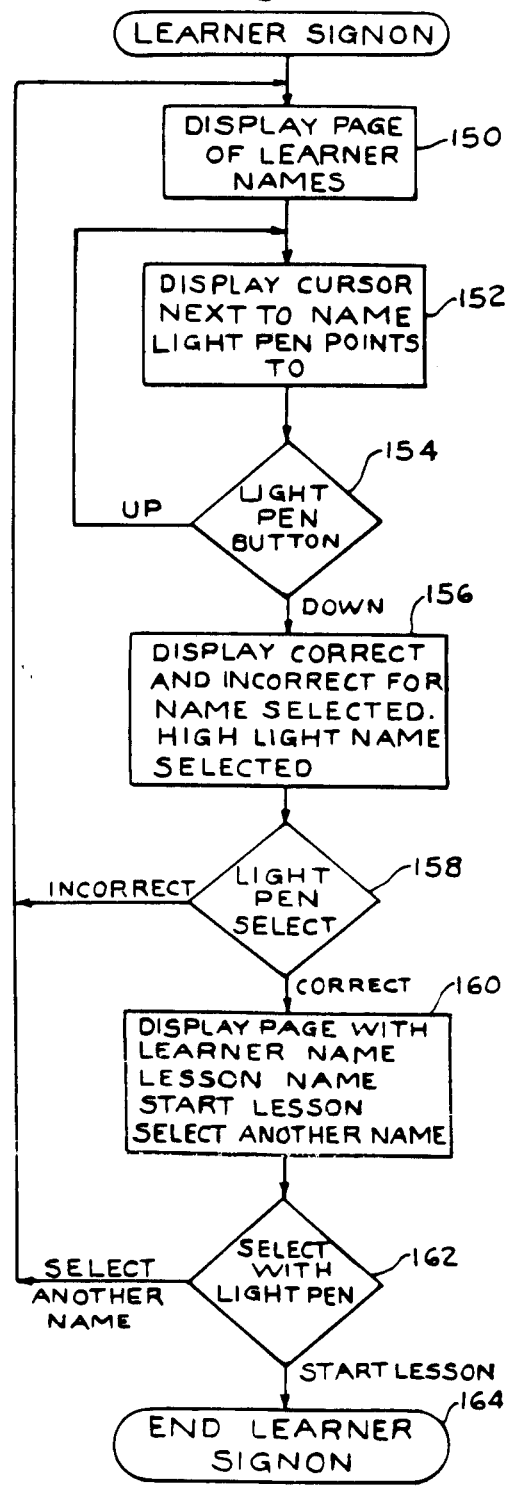

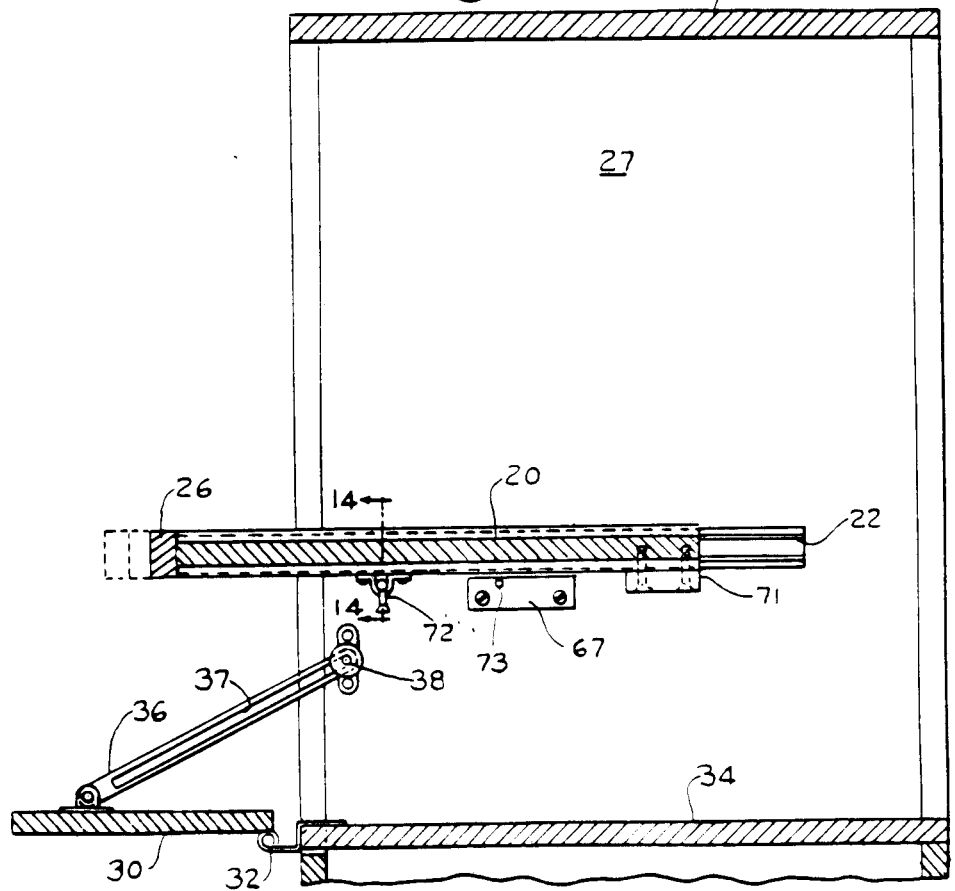
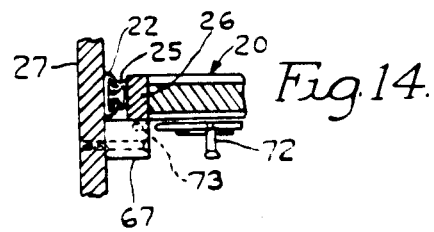

INTERACTIVE TRAINING METHOD AND SYSTEM

BACKGROUND OF THE INVENTION

A. Field of the Invention

The present invention relates generally to the field of training and more particularly to an improved interactive training method and system to enhance learner involvement and provide improved audio and visual information combinations and sequences.

B. Description of the Prior Art

Various arrangements of the prior art provide training and education programs utilizing various audio and visual effects including computer generated text and graphics.

More recently, control arrangements for addressing video cassette recorders and video disc players to organize presentations have come into wide use.

However, there is a constant need for improved training methods and systems utilizing more versatile audio and visual display combinations and improved learner interaction with the systems.

SUMMARY OF THE INVENTION

Accordingly, it is a principal object of the present invention to provide an improved interactive training method and system that operates under program control and in response to learner-operator input to provide lesson program information that combines video display motion sequences with accompanying audio information from a first record, single frame video display from the first record and correlated audio information from a second record, and computer generated text and/or graphics from a third record and correlated audio information from the second record.

It is another object of the present invention to provide an interactive training method and system that utilizes a light pen or other entry device as the interaction between a learner-operator and the system and that utilizes a keyboard or other entry device accessible only by an instructor-operator for enrollment and analysis of the learner-operators.

It is yet another object of the present invention to provide an interactive training method and system wherein the lesson presentation includes a pre-test portion wherein learner responses are graded and analyzed, a drill and practice portion wherein learner responses are analyzed but not graded so that no grading data is retained and wherein plural learner responses are analyzed to determine subsequent presentation of information including review and reinforcement, and a post-test portion wherein learner responses are graded and analyzed; an instructor via an authorized access arrangement reviewing the analyzed learner response data and scores.

Briefly, there and other objects of the present invention are efficiently achieved by providing an interactive training method and system for the selective presentation of audio and video training program information to learner-operators. The audio and video program information is transduced from recorded program media under the control of a program control unit. The program control unit includes a computer that is responsive to a control program record. The recorded audio and video program information and the control program define a lesson of a training program. Each lesson includes a plurality of lesson segments or units. The interactive training system includes a video transducing device for a first program record that includes video program information and accompanying audio information. The video transducing device is capable of single video frame display as a still frame. The system also includes an audio transducing device for a second program record that includes audio program information. The program control computer is also responsive to recorded program data to output computer generated text and/or graphic video display frames. Each learner-operator interfaces the system via a light pen entry device that provides video display frame position information. The program control computer provides a presentation of the lesson by selectively controlling a combination of addressable information segments from the first and second program records and the computer generated text and graphic recorded data in a predetermined display format as modified by multiple branching capabilities in response to learner-operator entry data information.

DESCRIPTION OF THE DRAWING

There and other objects and advantages of the present invention will become apparent by reference to the following description taken in conjunction with the accompanying drawing wherein:

FIG. 1 is a perspective view of interactive training apparatus for implementing the interactive training system and for practicing the interactive training method of the present invention;

FIG. 2 is a block diagram and electrical schematic representation of the interactive training apparatus of FIG. 1;

FIGS. 3 through 12 are flow diagram representations illustrating the operation of the present invention;

FIG. 13 is a partial elevational view partly in section and taken generally from the line 13—13 of FIG. 1; and FIG. 14 is a sectional view taken from the line 14—14 of FIG. 13.

DESCRIPTION OF THE PREFERRED EMBODIMENT

Figure 5:
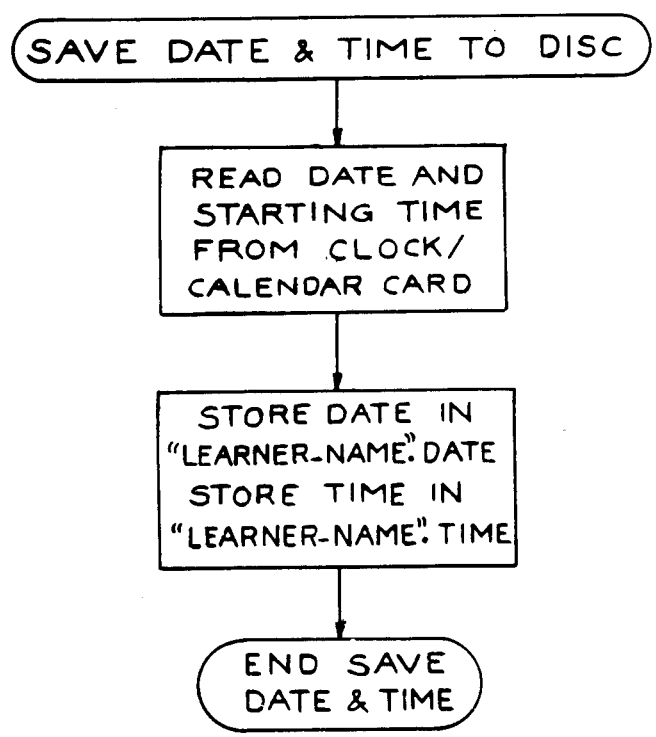

Referring now to FIG. 1, the interactive training apparatus 10 is useful for implementing the interactive training system and for practicing the interactive training method of the present invention. Of course, it should be understood that the interactive training apparatus 10 and the features of the present invention are also applicable to other interactive communication and information systems and methods. The interactive training apparatus 10 includes a cabinet or enclosure 12 having a base portion 14 provided with wheels 16. A video monitor 18 is carried on a slidable or otherwise movable shelf 20. Referring now additionally to FIGS. 13 and 14, the shelf 20 is slidably carried by receiving channels 22, 23 mounted on the left sidewall 27 and the right wall partition 29 respectively of the cabinet 12; the receiving channels 22, 23 cooperating with respective slide tracks 24, 25 on the shelf 20. The shelf 20 also includes an upwardly extending front wall 26 for grasping and sliding of the shelf 20 and further to prevent the video monitor 18 from extending beyond the front of the shelf 20. The front wall 26 extends beyond the left side of the shelf 20 to contact the front edge of the left sidewall 27 when the shelf 20 is moved inward into the cabinet 12. The shelf 20 further includes recessed portions suitably dimensioned and positioned to interfit with downward extending feet of the monitor 18 for securing of the monitor 18.

Below the sliding shelf 20, a keyboard input unit 28 or other suitable entry arrangement is provided and fixedly carried on the inside surface of a pivotally mounted shelf 30. The shelf 30 is pivotally mounted by hinges 32 at the front edge of a fixed shelf 34 of the cabinet 12, best seen in FIG. 13. The shelf 34 extends between the left sidewall 27 and the right sidewall 31. The right wall partition 29 extends between the shelf 34 and the top 33 of the cabinet 12.

The shelf 30 is thus movable about a horizontal axis between an upright, closed vertical position and an outward, folded down horizontal position as shown in FIGS. 1 and 13 extending outward from the cabinet 12 to allow access to the keyboard unit 28. When the shelf 30 is in the vertical closed position, the keyboard unit 28 is retracted into the cabinet 12 and thus inaccessible. The shelf 30 is supported in the folded down, horizontal position by a guide arm 36 that is pivotally mounted at one end to the inside surface of the shelf 30. The guide support arm 36 includes an elongated guide aperture 37, best seen in FIG. 13, that interfits with a guide pin 38 attached to the sidewall 27 of the cabinet 12 for slidably mounting the arm 36. A handle 35 is provided on the outer surface of the shelf 30.

The shelf 30 is latched in the vertical closed position by means of a key operated lock referred to generally at 40. The lock 40 includes an operative latch arm 42 that engages a receiving passage 44 in the right wall partition 29 when the latch arm 42 is rotated and the shelf 30 is in the closed vertical position.

A hinged door 48 is mounted for pivotting about a vertical axis along the right sidewall 31. The cabinet portions 29, 31, and 33 along with a shelf 49 extending between walls 29 and 31 define a storage area denoted at 50. A plate 52 is mounted on the rear surface of the door 48 and extends below the lowermost edge of the door 48. The extending portion of the plate 52 is trapped behind the foldout shelf 30 when the shelf 30 is in the closed vertical position so as to restrict access to the storage space 50. The rear or back wall 53 of the cabinet 12 in specific embodiments is removable from the cabinet 12, movably mounted with respect to the cabinet 12, or includes an access panel so as to provide access for service through the back of the cabinet 12.

A program control unit 100 including interface circuitry controls the operation of the interactive training apparatus 10 and is mounted on the shelf 34. A video disc player 54 is carried by a shelf 56 mounted below the shelf 34 and extending between the sidewalls 27, 31. Illustrative examples of suitable video disc players 54 are the Sony Model LDP-1000, Pioneer PR-7820, and Pioneer 8210. Further a random access audio unit 58 is carried on a bottom shelf 60 formed by the base 14 of the cabinet 12. The random access audio unit 58 in one specific embodiment is an INSTAVOX model RA-12 Rapid Access Audio unit available from Education and Information Systems, Inc. of Champaign, Ill.

The interactive training apparatus 10 also includes pivotally mounted doors 62, 64 which are opened to provide access to the video disc player 54 and the random access audio unit 58. A key operated lock generally referred to at 66 is mounted on the door 64 and includes an operative latch arm 65. When the doors are pivotted to the closed position, the latch arm 65 is moved behind the door 62 by operation of the lock 66. The doors 62, 64 are pivotally mounted to the sidewalls 27, 31 respectively by hinges 69. A spring loaded hook arm is mounted on the door 62 and interacts with a catch (not shown) extending downward from the bottom surface of the shelf 34 to lock the door 62. A release device 63 on the spring loaded hook arm 68 is manually operated after the door 64 is opened via the lock 66 to release the door 62. Thus, the doors 62, 64 by operation of the hook arm 68 and the lock 66 prevent unauthorized access to the video disc player 54 and the audio unit 58.

One or more magnetic floppy disc drives referred to generally at 70 are provided and supported by the shelf 34 and positioned between the partition 29, the right sidewall 31 and the shelf 49. Access to the disc drives 70 is restricted by means of the shelf 30.

With the shelf 20 extended outward to a predetermined position, a passive stop block 67 extending from the left sidewall 27 and below the receiving channel 22 is contacted by a contact block 71 extending outward from the shelf 20 and below the slide track 25 to limit the outward movement of the shelf 20. The shelf 20 is shown in FIGS. 1 and 13 in a partially extended position between the closed position and the fully extended, predetermined position. Referring now to FIGS. 13 and 14, to secure the shelf 20 in the inward closed position with the front edge wall 26 aligned with the front plane of the cabinet 12, the slidable shelf 20 includes a suitable arrangement, for example a manually operated lock and bolt referred to generally at 72 that cooperates with a receiving passage 73 in the stop block 67. The receiving passage 73 and the lock 72 are arranged to be aligned at the closed position.

The keyboard input unit 28 is electrically connected to the program control unit 100 via a multiconductor flat cable 76. The cable 76 is secured to the shelf 30 for strain relief purposes by a cable clamp 78. A main power switch 75 for the electrically supplied arrangements of the interactive training apparatus 10 is provided at the front of the shelf 34.

A light pen 74 or other suitable entry device is provided for the inputting of information by a learner operator as defined by various positions on the display of the monitor 18 as will be explained in more detail hereinafter. The light pen 74 includes an interconnection cable 77 terminated by a connector 79. The connector 79 mates with a connector 81 carried on the slidable shelf 20. A suitable light pen 74 is available from the Symtec Company of Farmington, Mich.

Referring now additionally to FIG. 2, the interactive training apparatus 10 operates under the control of a recorded lesson program or courseware including at least one floppy disc 80 inserted into the disc drive unit 70, a video disc 82 inserted into the video disc player 54, and an audio disc 84 inserted into the random access audio unit 58. The lesson program is prepared or authored independent of the interactive training apparatus 10 and is organized in accordance with preferred educational and training methods. Thus, each combination of discs 80, 82 and 84 comprise a specific training lesson or program presentation and a different set of these discs is utilized for each different lesson that is to be presented. The organization of the lesson program material on the discs 80, 82 and 84 and the interaction during the lesson presentation with an instructor-operator or a learner-operator will be described in more detail hereinafter.

Briefly, the floppy magnetic disc or discs 80 have recorded thereon the basic control program for the lesson presentation and also includes computer generated text and graphics information and is also used to store data assembled during lesson presentation. The basic control program on the disc 80 includes address information to appropriately access desired video and audio information on the discs 82 and 84. Thus, the audio disc 84 includes recorded information representing addressable audio segments of information and the video disc 82 includes addressable segments of video frames or screen displays and corresponding audio information recorded therewith.

During the presentation of the lesson and in response to learner-operator interaction via the light pen 74 or other suitable entry device, the control program recorded on disc 80 by means of the program control unit 100 controls the presentation of various video frames of information on the monitor 18 and appropriate corresponding audio presentation segments. For example, the following combinations of audio and video presentations are illustrative:

(1) A video motion sequence with corresponding audio segments obtained from a plurality of video frames of information and corresponding audio information on the video disc 82;

(2) A single video frame obtained as a still or freeze frame from the video disc 82 through operation of the video disc player 54 and corresponding audio segment information from the audio disc 84; and (3) Computer generated text and/or graphic video frame presentation obtained from data stored on the floppy disc 80 and appropriate audio segments from the audio disc 84.

In a training lesson for an automotive technician or mechanic for example, a video motion sequence with accompanying audio explanation in a specific example describes the procedure for properly removing and disassembling an automotive part or accessory from an automobile.

The interactive training apparatus 10 during training related use is operated by two categories of users; one or more instructor-operators and one or more learner-operators. The instructor retains the keys for the locks 40 and 66. To being a new lesson that requires new courseware, the instructor unlocks and opens the doors 62, 64 and inserts the video disc 82 into video disc player 54 and the audio disc 84 into the audio unit 58. Further the instructor unlocks and folds out the shelf 30 with the keyboard 28 and inserts the floppy disc 80 into the disc drive 70. The instructor then operates the keyboard 28 to enroll the desired learners by name or other identification as will be explained in more detail hereinafter.

The interactive training apparatus 10, with the lesson program courseware discs 80, 82, 84 inserted, is now ready for lesson presentation and interactive training by the learner-operators. Thus, the instructor folds in the keyboard 28 with the shelf 30 to the closed vertical position and locks the lock 40. Further, the instructor also closes the door 62, 64 and locks the lock 66. Accordingly, the learner-operators cannot access the keyboard 28 or the video disc player 54 or the random access audio unit 58 or the disc drive 70.

The learner-operators interact with the training apparatus 10 of the preferred embodiment solely by means of the light pen 74 or other suitable learner-operator entry device. The instructor operator also controls access to the power switch 75 and the storage compartment 50 since these areas are accessible only by unlocking the lock 40 and folding down the shelf 30. The lesson discs 80, 82 and 84 are preferably stored as lesson combinations in the storage compartment 50.

The learner-operator has control over the positioning of the video monitor 18 via the sliding shelf 20 and also functions of the monitor 18 such as audio volume level and the like. The instructor-operator by operation of the lock 72 or similar arrangement at the beginning of a training session or day of use releases the shelf 20 to allow adjustment by the learner-operator.

In addition to the insertion of new lesson discs as a three disc package of courseware and the enrollment of various learners in a particular lesson program, the instructor-operator also accesses the interactive training apparatus 10 via the keyboard 28 for requesting data on the learners' performance with the lesson materials and as to the completion of lesson units by the various learners as compiled and presented on the program control unit 100 and stored on the floppy disc 80.

In a preferred embodiment, the disc drive arrangement 70 includes two disc drives and the lesson courseware includes the discs 82 and 84 and two magnetic floppy discs 80a and 80b. The disc 80a for example is a lesson disc including the lesson control and presentation program data and the disc 80b is a data disc including learner progress data such as elapsed time, graded performance analysis data, etc. The data disc 80b in a specific embodiment also includes graphics data for program presentation. Further, a management disc 80c is provided including enrollment and data analysis program data as will be explained in more detail hereinafter. Thus, for the enrollment of the learners by the instructor-operator, the management disc 80c and the data disc 80b are inserted in the disc drive arrangement. For use by the learner-operators, the instructor operator removes the management disc 80c and inserts the appropriate lesson disc 80a; the data disc 80b remaining inserted. Then for data analysis use by the instructor-operator, the lesson disc 80a is removed and the management disc 80c is inserted. In this arrangement, the desired management data records including enrollment information and learner performance data is stored on the data disc 80b.

When the instructor-operator is entering information via the keyboard 28 with the shelf 30 in the open, outward position, the height of the shelf 30 and the keyboard unit 28 is suitable for use by the instructor in a seated position. Further, with the shelf 30 in the closed position and the shelf 20 moved to the outward extended position, the height of the video monitor 18 is suitable for use by a learner-operator in a seated position; the extension of the shelf 20 outward from the front plane of the cabinet 12 along with the keyboard array 28 and the shelf 30 being retracted into the cabinet 12 providing room for the knees of the seated learner-operator below the shelf 20 to allow efficient and ergonomical access by the learner-operator to the video monitor 18 for interaction with the presentation via the light pen 74. Further, with the shelf 20 in the inward, closed position, efficient acccess is also provided to the instructor-operator.

Accordingly, it should be understood that the heights of the shelf 20 and the shelf 30 are determined in accordance with ergonomical considerations based on the average and extremes of the height and proportion of the operators. For example, in one specific embodiment for illustrative purposes only and not in a limiting sense, with the wheels 16 on a level surface, the height of the keyboard unit is approximately 28 to 30 inches from the level surface and the distance from the center of the screen of the video monitor 18 to the level surface is approximately 44 to 48 inches.

Referring now again to FIG. 2, the program control unit 100 includes a microcomputer 102, an RS232 serial communications interface circuit 104, a video disc controller interface circuit 106, a disc drive interface circuit 108 and a light pen interface circuit 110. The interface 104 interfaces a parallel output databus 112 from the microcomputer 102 to the random access audio unit 58 over control line 114. The disc drive interface circuit 108 controls the disc drive 70 for the transfer of data from the floppy disc 80 to the microcomputer 102 over the control bus 116. The light pen interface circuit 110 interfaces the light pen 74 via control lines of the cable 77 to the microcomputer 102. The light pen interface circuit 110 also receives a video reference signal 120 from the video disc controller interface circuit 106.

The video disc controller interface circuit 106 interfaces video and control information from the video disc player 54 over control lines 122 and interfaces the microcomputer 102 over the control lines 126. The video disc controller interface circuit 106 further includes a video switch to selectively provide at video output 124 to the monitor 18 either the video output 125 from the microcomputer 102 or the video output 127 from the video disc player 54. The video switch of the video disc controller interface circuit 106 is controlled over a video switch signal line 123 from the microcomputer 102.

The video disc player 54 includes an audio output at 128 connected to a first input of an audio summing network 130. A second input 132 of the audio summing network 130 is connected to the audio output of the random access audio unit 58. The audio summing network 130 at output 134 provides the summed audio to the audio input of the monitor 18. The microcomputer 102 in a preferred embodiment is a Bell & Howell 48K microcomputer manufactured by Apple Computer Inc. and including memory expansion to 64K, a clock and calendar card, and a video generator system. The various interfaces 104, 106, 108 and 110 are provided as expansion cards and inserted into the expansion slots in the microcomputer 102.

The learner-operator when using the interactive training apparatus 10 discussed above interacts and responds to the apparatus 10 by the input of information via the light pen 74. The light pen 74 in the preferred embodiment includes a push tip actuator 136. The light pen 74 durng the input of information is pressed against the monitor 18 at a desired position to depress the push-tip actuator 136 and thus control the input of the represented screen or frame display position to the microcomputer 102. Accoringly, before the learner-operator begins a lesson, the learner signs on by positioning the light pens 74 to a position on the monitor 18 that displays the learner's identification or name and actuates the light pen 74 by depressing the actuator 136 against the screen face of the monitor 18. In this way the interactive training apparatus 10 identifies the learner-operator and stores later acquired data representing the performance and progress of the learner based on this identification.

In specific applications where it is desired to provide more secure and reliable learner identification, each learner-operator is provided with an identification device such as the key shaped device 140 that is inserted into a receiving socket or access device 142 suitably mounted on the training apparatus 10 for access by the learner-operator. The receiving socket 142 is interconnected with a controller circuit 143 by means of control lines 144 and is interfaced to the microcomputer 102 by means of an interface circuit 146. The identification device 140 in a specific embodiment includes a memory with identification information of the learner operator such as name, social security number, etc. Further in a specific embodiment, the identification device 140 includes a memory device that also provides for storage by the microcomputer 102 of appropriate data identifying learner progress and performance. In a specific embodiment, the identification device 140, socket 142, control lines 144, and controller circuit 143 are provided as model numbers DK1400, KC1400 and KT1400 sold under the trademark DATAKEY TM by Datakey, Inc. of Burnsville, MN. In other embodiments, various identification and compatible reading devices are utilized such as a card shaped device with or without memory elements housed therein.

Each of the training programs that is provided by the interactive training apparatus 10 under the control of the program control unit 100 with inserted lesson discs 80, 82 and 84 includes management portions and presentation portions. The management program portion includes recorded data representing provisions to control the system by an instructor operator, via the inputs on the keyboard 28, to enroll and identify a number of learner-operators and also for the analysis and display formatting of training results for one or more of the learners. In the broadest sense, the analysis and display of results for a particular learner includes a display of the learner's name or identification and the results of the various graded portions of the training lesson as will be explained in more detail hereinafter.

The presentation program portion, referring now to the flow diagram of FIG. 3, includes the high level program functions or subprograms of learner sign on via light pen, save date and time to disc, lesson presentation and save results to disc. In the preferred embodiment, each lesson presentation after learner sign on includes a pretest portion wherein the learner's responses to a predetermined series of audio and visual questions are graded; the learner's responses being entered via the light pen 74. The questions are in various formats to elicit correct responses in a number of formats including multiple choice, true-false, identification of a particular screen portion area, ordering, or describing a predetermined path or direction on the screen for direction sensitive responses.

In the preferred embodiment where a separate lesson disc 80a, data disc 80b, and management disc 80c are provided, the management disc 80c includes the management program portion and the lesson disc 80a includes the presentation program portions.

After the learner has taken the pretest, a predetermined plurality of drill and practice presentation portions are presented. In a specific embodiment the order of presentation of the drill and practice units are organized in a predetermined logical sequence but may be selected in a different order or selectively omitted by inputs from the learner via the light pen 74. Each training lesson ends with the presentation of a post-test to the learner with responses being graded; the post test being similar in format to the pretest.

After the learner-operator has signed on, he is presented with a menu selection screen display for example as follows with box numbers for reference purposes:

Touch light pen INSIDE the box of subject you want to see:

| MENU: ATX OVERHAUL | |
|---|---|
| [1] | How to use the lightpen and pretest |
| [2] | How to make pre-checks |
| [3] | Disassembly of converter, pump, clutches |
| [4] | Servo, main control |
| [5] | Overhaul/assembly of oil pump, clutches |
| [6] | Band, servo, reverse clutch |
| [7] | Differential, main control |
| [8] | Post Test |
| [9] | Video Evaluation |
| [10] | Leave the lesson |

The learner-operator selects the particular instructional units or program portion that is desired for the particular training session by touching the appropriate box with the light pen 74. This main menu display is redisplayed after each selected instructional unit is finished. Thus if the first box is selected by the light pen 74 to see the entire film, presentation follows with an introduction, the pretest, a series of practice and drill instructional units in a predetermined sequence presentation, and a post-test. The learner-operator on the otherhand could select any one or more of the other selections in any order and at the end of the presentation of each of the nine selections that may be chosen, the main menu selection screen display will be redisplayed for further choice and selection by the learner-operator.

Thus, for example, if the learner-operator selects selection box number 7, this program portion will be presented and thereafter the menu display will be redisplayed for another selection. The learner-operator by this method may select, for example, selection numbers 7, 3 and 5 in that order and again be returned to the main menu selection display after the presentation of 7, 3 and 5. If the learner-operator at any time chooses to leave the lesson the selection box "leave the lesson" is selected and the display is returned via program control to the learner sign on screen display. Thus for any selection but the leave the lesson selection, the main menu display selection is returned after the completion of a selected program portion.

The learner-operator may choose to take the entire lesson or desired portions thereof at one training session or spread over several training sessions. If several training sessions are engaged in to complete the lesson, the program control unit 100 records data on disc 80 representing the status of the learner-operator as to lesson segments already completed.

Further, as the learner-operator completes each lesson segment, the respective box adjacent each selection on the menu selection screen display is highlighted and identified as completed. For example, in a specific embodiment, the adjacent box is changed in color to denote completed versus incompleted selections. During the various presentation units such as pretest, drill and practice, and post test instructional units, various audio and visual combinations of program presentations are provided under the program control. For example, the following table lists some of these combinations:

| AUDIO | VIDEO |
|---|---|
| 1. Random Access Audio (84) | Computer Generated Graphics and/or Text |
| 2. Video Disc Audio (82) | Video Disc Motion Sequence (82) |
| 3. Random Access Audio (84) | Video Disc Still Frame (82) |

For example, audio-video combination No. 2 might be utilized in drill and practice instructional units to demonstrate proper procedures for removal, disassembly, assembly and installation of various automotive components or parts. In this way the interactive training apparatus 10 provides an animated sequence showing appropriate motions and timing to demonstrate the actual steps and actual working environment with automotive parts and tools and accompanying audio explanation and narrative as well as corresponding sounds resulting from the manipulations by the car technician or mechanic.

The audio-video combination No. 3 is useful in both the pretest or post test units and also in the drill and practice units. For example, in the pretest or post test, the question is posed by the audio portion from the random access audio disc 84 where the learner for example may be asked to point with the light pen 74 to the appropriate portion of the displayed video information on the video monitor screen 18 so as to "locate the drive gear in the picture".

Another example of combination No. 3 would occur where a question is posed during a pretest or post-test and the learner-operator is asked via the light pen 74 to indicate a direction, path or shape on the screen of the monitor 18. In response, microcomputer 102 operating under program control of the program disc 80 analyzes the sequence of inputs by movement of the light pen 74 over the face of the monitor 18 with actuation of the light pen 74 via the push-tip actuator 136 at each desired position. For example, the question posed might be "show how to install the drive gear by touching the technician's left hand and showing the appropriate action". In response, the learner-operator moves the light pen 74 over the monitor screen 18 with an appropriate clockwise movement and either maintaining the push-tip actuator 136 in the actuated position or actuating the pen 74 at various intervals. For example, for this type of analysis of a proper response, the microcomputer 102 with the program of disc 80 interprets the sequence of areas indicated on the monitor 18 as a correct clockwise movement.

An example of audio video combination No. 1 in a pretest or post test instruction unit is the listing of four or five assemblies or disassembly steps of a particular operation and asking the learner-operator to "Put these steps in the right order" with the video display and computer text listing the steps and the proper response by the learner-operator requiring the actuation of the light pen 74 at the displayed steps in the correct sequential order.

Considering now the operation of the interactive training apparatus 10 in accordance with the program control unit 100 programmed by the program disc 80 and referring now to the logical flow diagrams of FIGS. 4-12, the learner sign on function, the save date and time to disc function, the lesson presentation function, and the save results to disc function are illustrated in more detail in FIGS. 4-7 respectively.

For example and referring now to FIG. 4, the learner sign on function starts with a display of the page of learner names at 150, and proceeds to process step 152 to display the cursor next to the name to which the light pen 74 is pointing. The program flow then proceeds to decision element 154 where the determination is made whether or not the light pen 74 is actuated or not with the push-tip actuator 136 in the up or down position. If the light pen is unactuated in the up position, the program flow proceeds back to the process block 152 to continue the display of the cursor next to the name the light pen is pointing to until the time that the learner-operator actuates the light pen actuator 136 to the down position. When the light pen 74 is actuated, the program flow proceeds from the decision block 154 to the process block 156 by highlighting the name selected such as by changing the background color of the selected name as a highlighted box or changing the color of the text of the name.

The program flow then proceeds to a decision block 158 where the determination is made as to whether or not the light pen selection is correct or incorrect. If the light pen selection is incorrect, as defined by the light pen being actuated by the learner at an incorrect designated area of the display, the program flow proceeds back to the process block 150. If the determination by the light pen selection is correct, by the learner actuating the light pen at a correct designated area of the display, the program flow proceeds to a process block 160 to display the page with the learner name and lesson name to indicate to the learner-operator that the selection of the learner's name has been accepted. The learner is then prompted by the display to either start a lesson or select another name.

The program flow then proceeds to a determination block 162 to determine whether the learner operator via the light pen has selected another name or has started the lesson selection. If the learner-operator selects another name, the program flow proceeds back to the process block 150. If the learner-operator selects to start the lesson, the program flow proceeds to terminate the learner sign on function as denoted at 164.

In accordance with the flow diagram of FIG. 3, the basic program proceeds from the learner sign on to the save date and time to disc function illustrated in detail in FIG. 5. This function provides for the reading and storing of the date and starting time for the particular learner for use by the instructor operator in accordance with the management program function. After the save date and time to disc function of FIG. 3 has been performed, the program flow proceeds to the lesson presentation function illustrated in more detail in FIG. 6.

Figure 6:
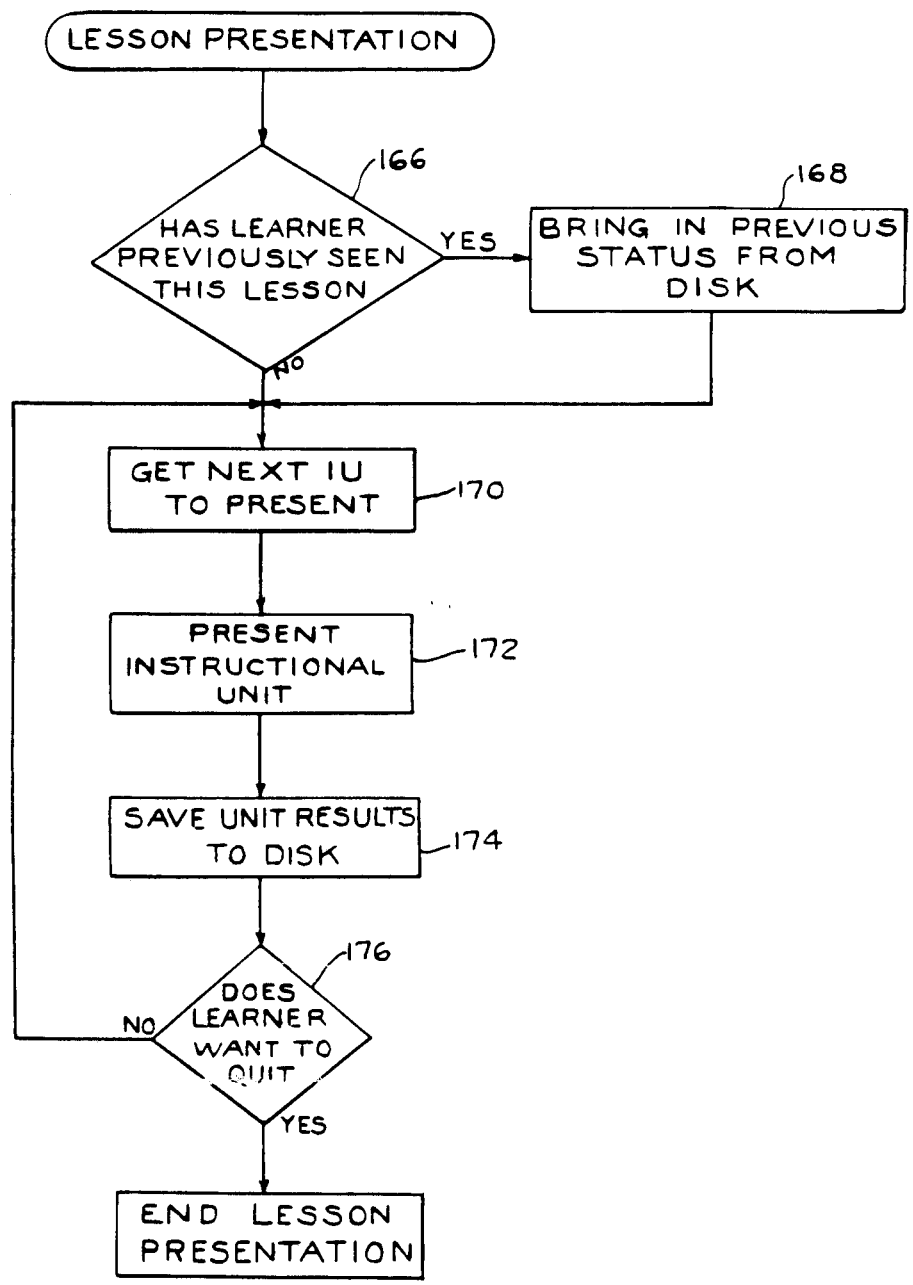

Referring now to FIG. 6, the lesson presentation function starts with a determination block 166 to determine whether the particular learner has previously seen this lesson. If the determination is yes, the program flow proceeds through a process block 168 to bring in or call up the previous status from disc. The program flow then proceeds from the process block 168 to a process block 170 to get the next instructional units to present as based on the called up data as to the learner's previous status in the lesson. This previous status data including elapsed time of the learner could be used for example to select the next instructional unit that has not previously been presented to the particular learner in previous sessions or to highlight on the main menu selection those selections which have previously been seen, for example by changing the color of the selection boxes to denote the instructional units that have been presented or taken by the learner during previous training sessions.

If the determination in the decision block 166 is no, the program flow also proceeds to the decision block 170 to get the next instructional unit to present. After the process block 170, the program flow proceeds to a process block 172, present the instructional unit. The presentation of the instructional unit function in the process block 172 will be discussed in more detail hereinafter in connection with the flow diagram of FIG. 9. The program function to get the next instructional unit to present represented by process block 170 will be described in more detail hereinafter in connection with FIG. 8.

The program flow proceeds from the process block 172 to the process block 174 to save the instructional unit results to disc. After the process block 174, the program flow proceeds to a determination block 176 to determine if the learner operator wants to quit or exit the lesson. If the determination in block 176 is yes, the program flow proceeds to end the lesson presentation function or program section. If the learner does not want to exit, the program flow proceeds back to the process block 170 to get the next instructional unit for presentation in accordance with the learner-operator selection from the menu display.

Figure 7:
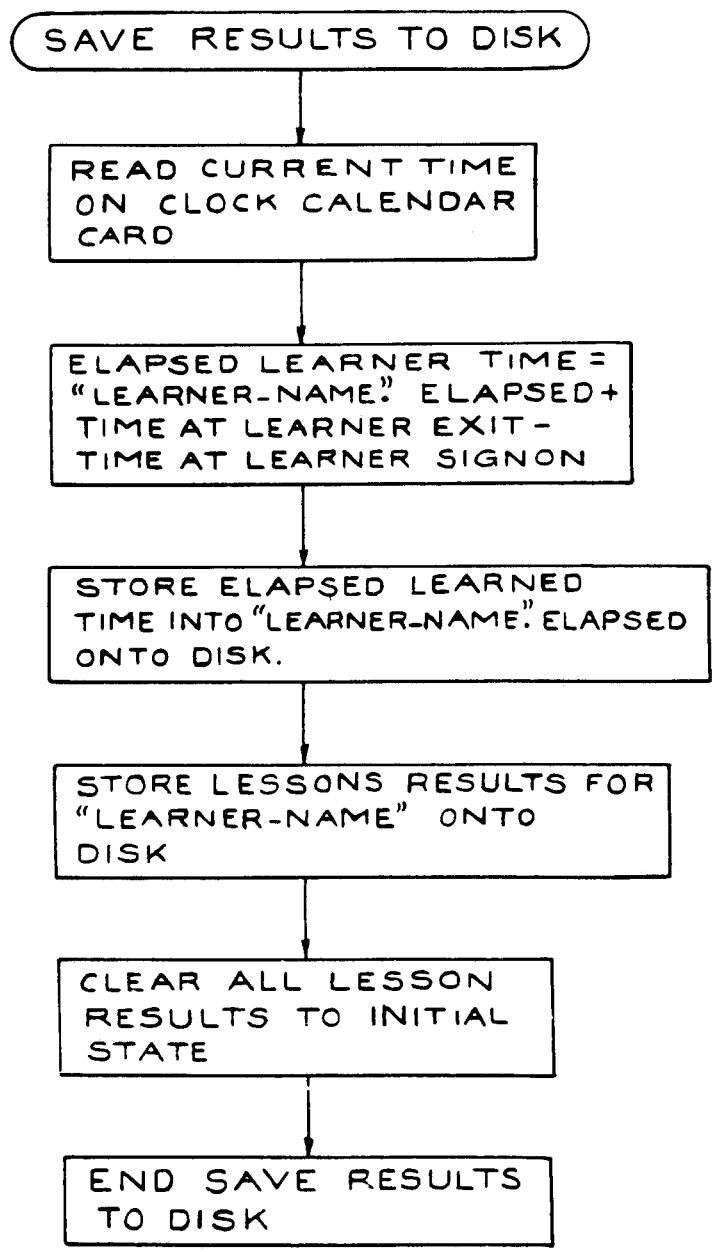

In FIG. 3 after the lesson presentation function has been performed, the program functional flow proceeds to the save results to disc function as outlined in FIG. 7. Referring now to FIG. 7, the save results to disc function includes the various flow steps for reading the appropriate data including the sign off or current time, calculating the elapsed time, and storing the elapsed learner time into the learner name file on the disc. The save result to disc function further includes storing the lesson results for the learner name onto the disc and clearing all lesson results to the initial state.

Figure 8:
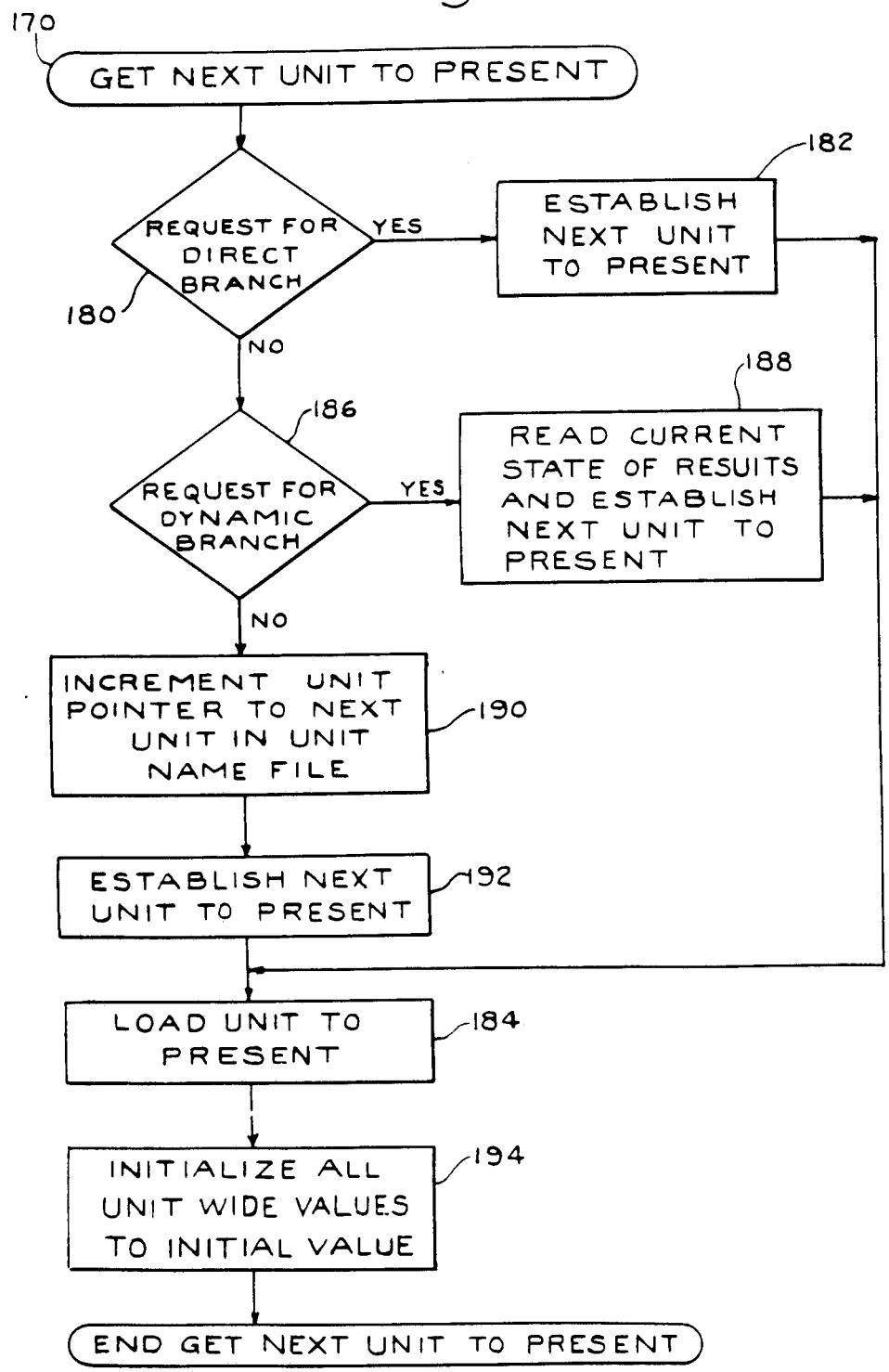

Referring now to FIG. 8, the get next instructional unit to present process block 170 is shown in more detail for a specific embodiment wherein selection of various instructional units is by direct and dynamic branching decisions under program control on the basis of learner responses to previous instructional units and from the pretest unit. Of course, it should be understood that both direct or static branching and dynamic branching is provided within each instructional unit in a specific embodiment for selection of various portions of each instructional unit.

The get next unit to present function 170 starts in determination block 180 to determine if there has been a request for direct branch established by previous unit presentations or by the pretest. If the determination is yes for direct branch, the program flow proceeds to process block 182 to establish the next unit to present. After process block 182, the program flow then proceeds into process block 184 to load the next instructional unit to present that has been established in process block 182. If the determination is no in determination block 180 so that no request for a direct branch is made, the program flow proceeds to a determination block 186 to determine if a request for dynamic branch has been made. If the determination is yes, the program flow proceeds through a process block 188 to read the current state of results and establish the next unit to present. After process block 188, the program flow proceeds to the process block 184. If the determination in flow block 186 is no, the program flow proceeds to a process block 190 to increment the unit pointer to the next unit in the unit name file. The program flow then proceeds through a process block 192 to establish the next unit to present and again to process block 184 to load the unit to present. After the process block 184 to load the instructional unit to present has been accomplished, the program flow then proceeds to a process block 194 to initialize all unit wide values to the initial value; all values of counters for example in the instructional unit. This ends the process flow for the get next unit to present function 170.

Figure 9:
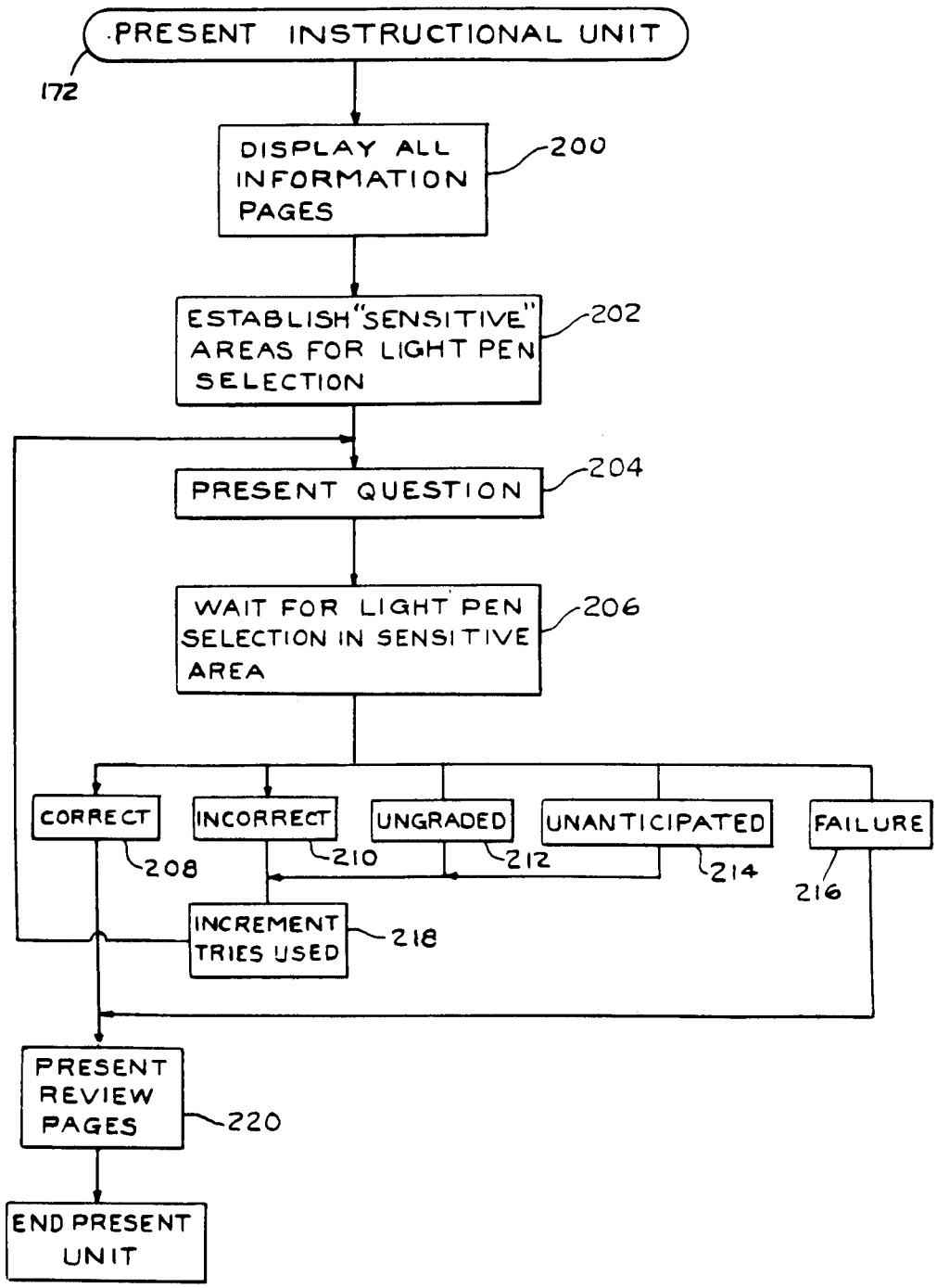

Considering now the present instructional unit process block 172 of FIG. 6 in more detail and referring now to FIG. 9, the present instructional unit function 172 starts in a process block 200 to display all information pages and then proceeds to a process block 202 to establish the sensitive areas for light pen selection; i.e., to indicate which portions of the monitor screen will be considered a response to a particular question or lesson presentation whether the response is correct or incorrect. After the process block 202, the program flow proceeds to a process block 204 to present the next question. After the process block 204, the program flow proceeds to a process block 206 to wait for light pen selection in one of the sensitive areas. From process block 206, the program flow then proceeds to one of the response process blocks 208, 210, 212, 214 or 216 in accordance with the correlations between the established sensitive areas for light pen selection and the screen area that is selected with the light pen 74 by the learner operator.

The process block 208 of FIG. 9 is a correct response process block. The process block 210 is an incorrect response block, process block 212 an ungraded response, process block 214 an unanticipated response, and 216 is a failure response block corresponding to the response received after all allotted tries have been exhausted. If the light pen selection corresponds to the incorrect response block 210, the ungraded response 212 or the unanticipated response 214, the program flow proceeds through the increment tries used block 218 and then back to the present question block 204 corresponding to another try presented to the learner operator. If the program flow proceeds through the failure response block 216, the program flow proceeds to the process block 220 to present review pages to the learner operator. The ungraded response block 212 represents acutation of the light pen 74 to designate sensitive areas such as help or other responses that are not in the graded response category. The unanticipated response block 214 is utilized where input of data is not performed exclusively by the light pen 74 and includes provisions for keyboard entry of data and keyboard characters that are not anticipated.

Figure 10:
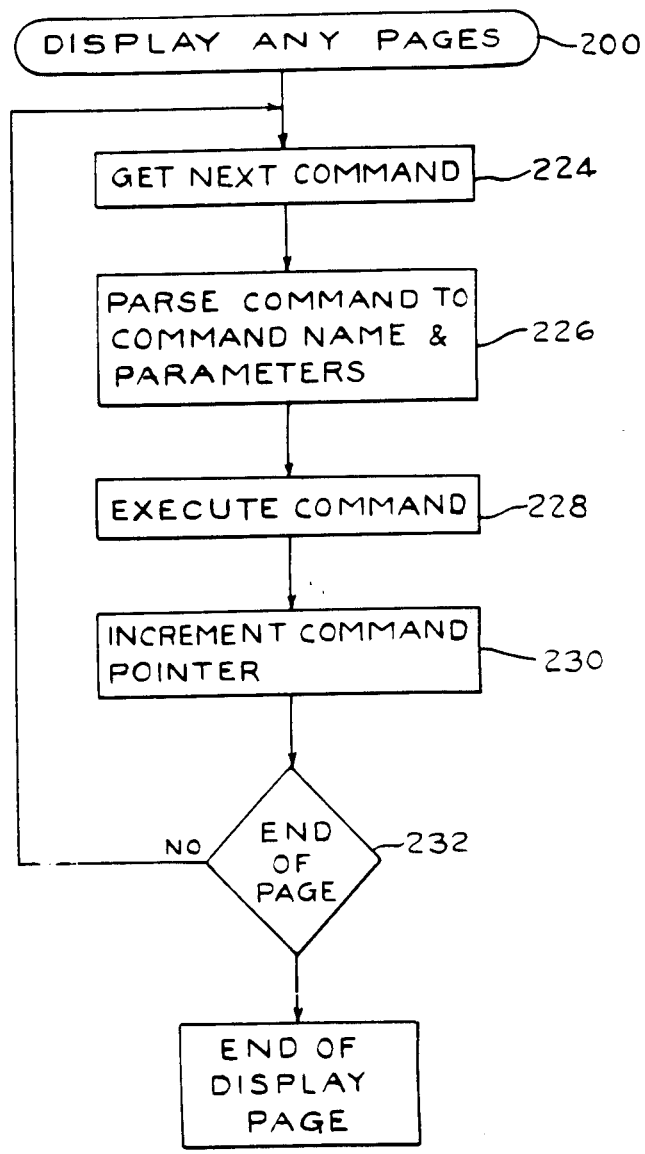

Considering now the display information page process block 200 in FIG. 9 in more detail and referring now to FIG. 10, the display information pages process starts with a process block 224 to get the next command. The program flow then proceeds to a process block 226 to parse or split-up the command to the component parts of the command name and the parameters. The program flow then proceeds to an execute the command process block 228 and then on to a process block 230 to increment the command pointer. The program flow then proceeds from the increment command pointer process block 230 to a determination block 232 to determine if this is the end of a page. If the determination is yes, the program flow proceeds out of the display and page function to end the display page function. If the determination in the block 232 is no, this is not the end of a page and the program flow proceeds back to the process block 224 to get the next command.

Figure 11:
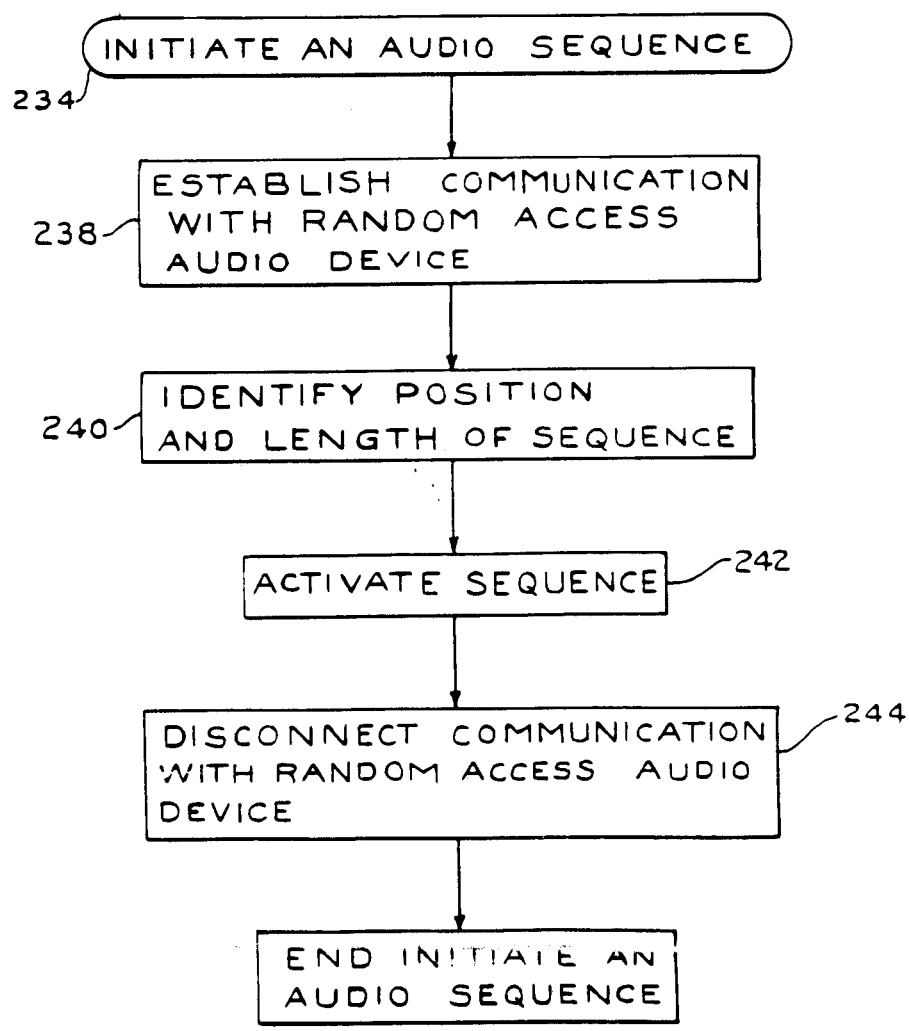
Figure 12:
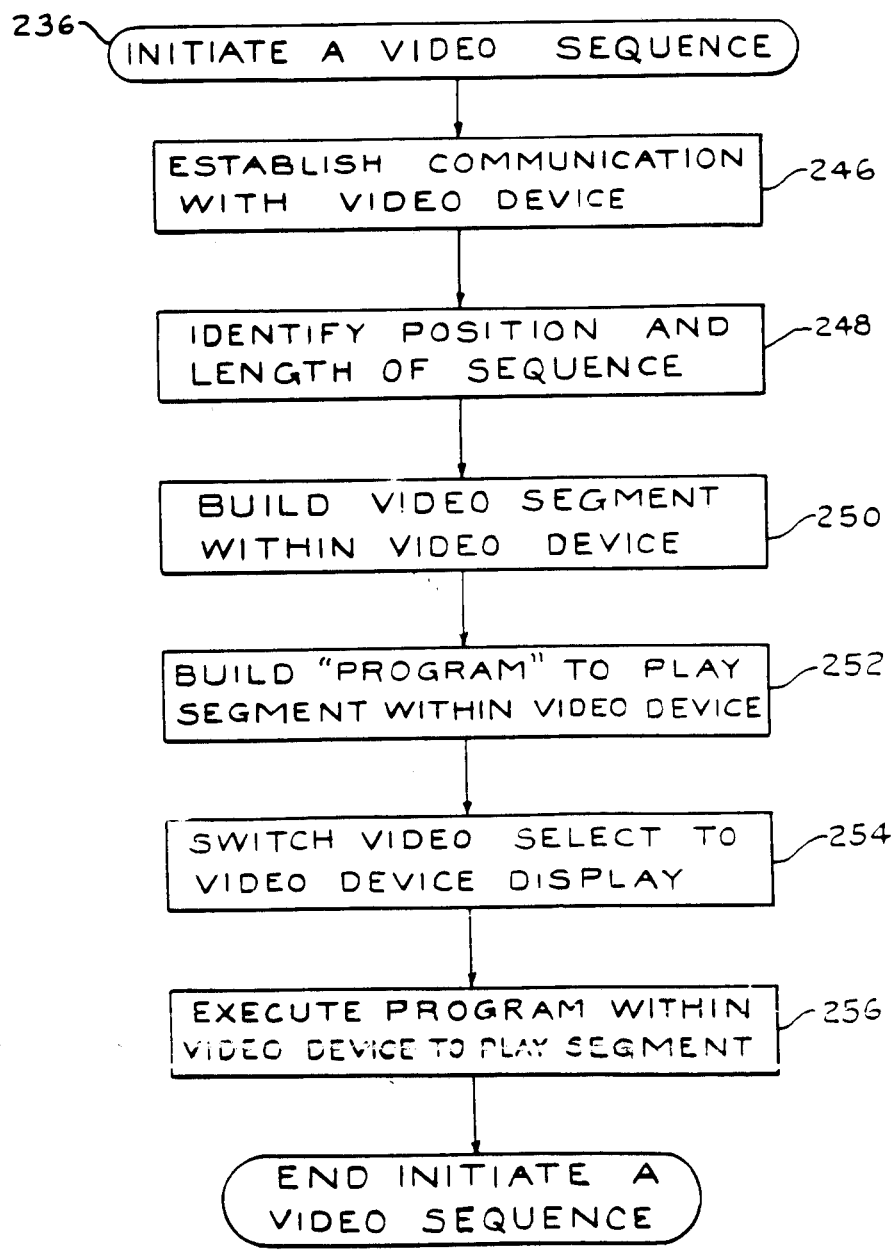

Considering the execute command process block 228 of FIG. 10 in more detail, the execute command process block includes an initiate an audio sequence process 234 shown in detail in FIG. 11 and an initiate a video sequence process 236 shown in more detail in FIG. 12.

Referring now to the initiate an audio sequence process 234 of FIG. 11, the process begins in process block 238 to establish communications with the random access audio device. The program flow then proceeds to a process block 240 to indentify the position and length of the desired sequence. The program flow then proceeds to a process block 242 to activate the desired sequence. After the desired sequence has been activated, the program flow then proceeds to a process block 244 to disconnect the communications with the random access audio device and then to end the audio sequence process 234.

The initiate the video sequence 236 of FIG. 12 begins with a process block 246 to establish communications with the video device such as the disc player 54. The program flow then proceeds to an identify the position and length of the sequence and process block 248. After the block 248, the program flow then proceeds to a process block 250 to build the video segment within the video device and then to a process block 252 to build a program to play the segment within the video device. After the process block 252, the program flow then proceeds through a process block 254 to switch the video select switch signal to the video device display mode and then to a process block 256 to execute the program within the video device to play the required segment. This ends the video sequence and initiate function 236 of the execute command process.

While there has been illustrated and described several embodiments of the present invention, it will be apparent that various changes and modifications thereof will occur to those skilled in the art. For example, while a video monitor 18 and a video disc player 54 are discussed in the preferred embodiment, various other visual presentation devices are utilized in other specific embodiments. For example, a film strip projector, slide projector or cineprojector is suitable for the visual presentation device with random access control of these arrangements. Additionally, while a slidable shelf 20 is described in the preferred embodiment, other arrangements are utilized in specific embodiments to provide movement of the visual display device such as monitor 18 out from the apparatus 10; for example by rotation. Further, a video cassette recorder is utilized in place of the video disc player 54 in a specific embodiment. Further, in place of the light pen 74 with connection via cable 77, an infrared transmission and reception link is utilized in a specific embodiment. Additionally, other learner entry devices are provided in specific embodiments. Considering the format of the discs 80, 82, and 84, in another embodiment, a video disc player 58 is substituted for the random access audio unit 58. Thus, the disc 84 is also a video disc. In one specific embodiment, the discs 82 and 84 are identical and the discs include video and accompanying audio information on channel 1 for example for transducing by the video disc player 54 and the random access audio program information on channel 2 for example for transducing by a video disc player substituted for the unit 58. In another specific embodiment, the video disc 84 includes only audio recorded thereon and is different from the video disc 82. When the two video discs are different, both audio channels of the video disc 84 can be utilized for random access audio information for increased capacity and one or both of the audio channels of the video disc 82 can be utilized and separately addressed for accompanying audio information. In yet another arrangement, a digitally encoded audio disc 84 is utilized with a suitable audio disc transducing unit for the unit 58. Of course, it should be realized that in other specific embodiments the discs 80, 82, and 84 are various combinations of records fixed in or on suitable record media.

Considering a specific embodiment of the process block 202 of FIG. 9 for the assignment of sensitive areas of the display frame for light pen selection, the display frame is mapped by area to correspond to different characters on the keyboard unit 28. Thus, the timing signal received from the light pen on cable 77 and the synchronization timing signal 120 define a position of the display frame that is translated into a corresponding keyboard character input. Accordingly, if the letter "K" is assigned to a particular screen input sensitive area, the program for proper response can be written to accept a "K" input as a correct response. Considering a specific embodiment of the management program portion to analyze and display learner progress and performance, the display presented to the instructor-operator through keyboard access includes the name and identification of the learner-operator such as social security number or employee number, the date, the elapsed time of the training session, the pretest score, the post test score, the % gain between the pretest and post test scores and the absolute % of correct answers on the post test.

It is intended in the appended claims to cover all such changes and modifications as fall within the true spirit and scope of the present invention.

What is claimed as new and desired to be secured by Letters Patent of the United States is:

1. Interactive information apparatus comprising:
    program control means for controlling the presentation of information and for receiving inputs from operators;
    first operator entry means for inputting response information to said program control means and being accessible to a first category of instructor users of the apparatus; and
    second entry means for inputting information to said program control means and being accessible to a second category of learner users and wherein said first operator entry means is inaccessible to said second category of learner users, said second entry means including operable entry means and means for limiting access to said operable entry means.

2. The interactive information apparatus of claim 1 further comprising a video display device, said first entry means comprising operable means for supplying a signal representing positions on the display of said video display device.

3. A method for controlling the operation of an interactive information system comprising the steps of:
    limiting the access to a first entry device to a first category of instructor users for entering information to the system; and
    receiving entry information from a second category of learner users solely from a second entry device where the second category of learner users do not have access to said first entry device.

4. The method of claim 3 wherein said interactive information systems provides a visual display and said second entry device comprises means for supplying input signals to the interactive information system that represent position information of said visual display.

5. The method of claim 4 wherein said visual display is provided on a screen of a video display device and said second entry device comprises a user operable light pen moved relative to said screen.

6. A method of providing response input information to an interactive information system that provides information on a video display screen comprising the steps of:
    limiting the access to a first entry device to a first category of instructor users for entering information to the system;
    receiving entry information from a second category of learner users solely from a second entry device where the second category of learner users do not have access to said first entry device; and
    inputting information solely by indicating various positions on said video display screen with the use of a user operable light pen that supplies information representing positions on said video display screen.

7. A method of inputting and evaluating responses from a learner-operator in an interactive training system, the learner-operator responses being entered by a learner-operator entry device that supplies video display position information at a response signal input, the video display being controlled by the interactive training system, the method comprising the steps of:
    limiting access to a predetermined learner-operator;
    assigning predetermined response areas to a display frame in terms of representations of input characters on a keyboard;
    receiving video display framing position information from the predetermined learner-operator entry device;
    translating the received display frame position information in accordance with said assigning step to provide an assigned corresponding representation of said input character; and
    evaluating the learner-operator response in terms of said assigned corresponding representation of said input character.

8. An interactive information system comprising:
    a visual display device responsive to a visual signal input;
    an audio output device having an audio signal input;
    program control means for controlling operation of said interactive information system, said program control means comprising a microcomputer;
    visual display program signal means responsive to said program control means and including addressable frames of visual display program information and accompanying audio program signals for generating visual display program signals and accompanying correlated audio program signals, said visual display program signal generating means including visual display control accessing means responsive to said program control means for selectively accessing one or more addressable frames of visual display program information on a random access basis;

audio program signal means responsive to said program control means and including addressable audio program portions for generating audio program signals, said audio program signal generating means including audio control accessing means responsive to said program control means for selectively accessing said addressable audio program portions on a random access basis;

said audio program signals from said visual display program signal generating means and said audio program signal generating means being connected to said audio signal input of said audio output device, said visual display signals being connected to said visual signal input of said visual display device;

entry means for inputting learner operator responses to said program control means in a predetermined format; and said entry means including means for limiting access thereto.

9. The interactive information system of claim 8 wherein said entry means comprises means for designating a particular portion of said visual display on said visual display device, said entry means including signal means for generating a signal to said program control means that corresponds to a predetermined portion of said visual display.

10. The interactive information system of claim 9 wherein said visual display device includes a display surface and said entry means comprises a light pen and manually operable actuator means carried by said light pen and being operable from an unactuated condition to an actuated condition.

11. The interactive information system of claim 10 wherein said manually operable actuator means comprises a movable tip portion of said light pen that is actuated when an operator presses said light pen against said visual display of said display device.

12. The interactive information system of claim 10 wherein said signal generating means is responsive to said manually operable actuator means, said visual display device is a video monitor or receiver, said generated signal providing a timing reference to said program control means that represents video display position information in terms of display timing signals.

13. The interactive information system of claim 8 wherein said program control means includes visual display data and visual display generator means responsive to said visual display data for generating visual display program signals, said program control means further including visual display signal switching means responsive to a visual display control switch signal and including said visual program signals from said visual display program signal generating means and said visual display generator means at two respective inputs, said program control means generating said visual display control switch signal, said visual display signal switching means being responsive to said visual display switch control signal to selectively provide one of said two input signals to said visual display device.

14. The interactive information system of claim 8 wherein said program control means includes a control program record, said visual display program signal generating means includes an audio and visual display program record, and said audio program signal generating means includes an audio program record.

15. The interactive information system of claim 14 wherein said control program record, said audio and visual display program record, and said audio program record comprise a coordinated predetermined training program, said control program record including a series of program control steps and address steps to access correlated addressed portions of said audio and visual display program record and said audio program record.

16. The interactive information system of claim 15 wherein said control program record includes data representing the correlated presentation of single frame visual displays from said visual display program record and audio program signals from said audio program record.

17. The interactive information system of claim 16 wherein said control program record further includes data representing the presentation of addressable multiple frame segments of said visual display program record and accompanying audio portions.

18. The interactive information system of claim 14 wherein said control program record, said audio and visual display program record, and said audio program record are fixed onto respective predetermined transducable media, each of said program control means, said visual display program signal generating means and said audio program signal generating means comprising means for accepting and transducing said control program record, said audio and visual display program record, and said audio program record respectively.

19. The interactive information system of claim 18 wherein said control program record, said audio and visual display program record, and said audio program record comprise predetermined shapes and formats of said transducable media.

20. A method for controlling operation of an interactive information system comprising the steps of:
(a) identifying a particular learner-operator;
(b) generating a visual display of indicia representing program segments for presentation;
(c) accepting an input from a user-operated entry device representing selection of one of said displayed program segments;
(d) presenting the selected program segment; and
(e) generating said visual display of indicia representing program segments for presentation including a visually perceptible indication of the program segments that have been previously presented to said particular learner-operator.

21. The method of claim 20 further comprising the repetition of steps b through d.

22. The method of claim 21 further comprising the step of providing an exit selection representation on said visual display and exiting a program selection and presentation mode of operation of the interactive information system upon selection of said exit selection representation by said user-operated entry device.

23. The method of claim 20 wherein said program segment indicias are alphanumeric character representations and said visual display further includes a program segment indicator symbol adjacent each individual program segment representation.

24. The method of claim 23 wherein said visually perceptible indication of previously presented program segments includes changing said program segment indication symbol.

25. The method of claim 24 wherein the color of said program segment indication symbol is changed.

26. A method for the presentation and operation of an interactive training lesson utilizing a training system including audio and visual outputs and a presentation control arrangement responsive to a predetermined learner entry device, the method comprising the steps of:

enrolling one or more defined learners by input data entered by an instructor-operator on a first predetermined entry device;

signing-on one of said defined learners by input of identification data by said learner with said learner entry device;

presenting a pretest presentation unit including a plurality of questions presented to said one learner and accepting learner responses thereto entered by said learner entry device;

accumulating a learner pre-test score in response to said learner responses;

presenting a drill and practice unit including a plurality of information, questions, feedback and review as audio and visual outputs, said presentation being arranged in a predetermined sequential order and being presented in a selectively variable branching order in accordance with the learner responses entered by said learner entry device;

presenting a post-test presentation unit including a plurality of questions presented to said one learner and accepting learner responses thereto entered by said learner entry device;

accumulating a learner post-test score in response to said learner responses; and presenting a predetermined learner analysis display in response to a predetermined request by said instructor-operator entered on said first predetermined entry device, said learner analysis display including an identification of said learner, and the corresponding pre-test and post-test scores.

27. The method of claim 26 wherein said first predetermined entry device is a limited access device for access only by said instructor-operator.

28. The method of claim 26 wherein said first predetermined entry device and said learner entry device are independent entry devices.

29. The method of claim 28 wherein said entry devices are different types of entry devices.

30. The method of claim 28 wherein said first predetermined entry device is a keyboard array and said learner entry device is a light pen, said visual output of said training system including a video monitor.

31. The method of claim 26 wherein said drill and practice unit includes animated video displays with accompanying audio information.

32. A method of providing learner-operator response to an interactive training system that represents an arbitrary motion, path or direction with respect to a video display frame of a video display device, the learner-operator utilizing a predetermined entry device that supplies a signal representing video display frame position, the method comprising the steps of:

limiting access to a predetermined learner-operator;

assigning positional area representations to the display frame;

inputting display frame position information from the predetermined learner-operator entry device to the interactive training system;

assembling said inputted display frame position information as an ordered sequence of positional areas of the display frame; and evaluating said ordered sequence of positional areas of the display frame to determine the direction and/or path established by said sequence by comparison with said assigned positional area representations.

33. A method for providing interaction responses by a learner-operator to an interactive training system for the purpose of receiving identification of the learner-operator, the learner-operator inputting responses to the interactive training system by an entry device thast supplies signals representing display frame position of a video display device and a signal representing a learner-actuation response, the method comprising the steps of:

generating a display frame of learner identification representations;

generating on said display of learner identification representations an indicator that is displayed as a function of time at a display frame position corresponding to the position represented by the input response of the learner-operator;

generating on said display frame a correct and incorrect indication representation when a learner actuation response signal is inputted; and establishing the identity of the learner-operator on the basis of learner-response input signals as the learner identification representation corresponding to said indicator display when a learner-operator response signal is input corresponding to said correct indication representation.

* * * * *